United States Patent
Lee et al.

(10) Patent No.: US 6,958,137 B2
(45) Date of Patent: Oct. 25, 2005

(54) PREPARATION OF COMPOSITE SILICA MEMBRANES WITH THERMAL STABILITY BY A SOAKING-ROLLING METHOD

(75) Inventors: Kew-Ho Lee, Daejeon (KR); Dong-Wook Lee, Daegu (KR); Yoon-Kyu Lee, Daejeon (KR); Bong-Kuk Sea, Daejeon (KR); Seung-Eun Nam, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 180 days.

(21) Appl. No.: 10/677,222

(22) Filed: Oct. 3, 2003

(65) Prior Publication Data

US 2004/0071894 A1 Apr. 15, 2004

(30) Foreign Application Priority Data

Oct. 4, 2002 (KR) ................................. 10-2002-0060554

(51) Int. Cl.[7] .......................... C01B 33/12; B01J 20/28; B01J 21/08; B01J 21/12; B01J 21/14
(52) U.S. Cl. ............................. 423/335; 502/4; 502/233
(58) Field of Search ................................ 423/335, 338; 502/4, 232, 233

(56) References Cited

U.S. PATENT DOCUMENTS

| | | | | |
|---|---|---|---|---|
| 4,791,079 A | * | 12/1988 | Hazbun | 502/4 |
| 5,156,895 A | * | 10/1992 | Martin | 428/72 |
| 5,429,743 A | * | 7/1995 | Geus et al. | 210/490 |
| 5,605,631 A | * | 2/1997 | Barri et al. | 210/650 |
| 6,074,972 A | * | 6/2000 | Bratton et al. | 502/4 |
| 6,235,258 B1 | * | 5/2001 | Muller et al. | 423/335 |
| 6,486,086 B1 | * | 11/2002 | Kuznicki et al. | 502/4 |
| 6,635,594 B1 | * | 10/2003 | Bratton et al. | 502/4 |
| 6,689,195 B1 | * | 2/2004 | Anthonis et al. | 95/143 |
| 6,734,129 B2 | * | 5/2004 | Lai et al. | 502/4 |
| 6,767,384 B1 | * | 7/2004 | Vu et al. | 95/45 |
| 6,818,333 B2 | * | 11/2004 | Chau et al. | 428/702 |

OTHER PUBLICATIONS

Burggraaf, "Fundamentals of Inorganic Membrane Science and Technology". Elsevier, N.L, pp. 297–298, (1997).

Nair Galagopal et al., "Sol–gel Synthesis of Molecular Sieving Silica Membranes", Journal of Membrane Science, vol. 135,, pp. 237–243, (1997).

Renate M. de Vos et al., "Improved Performance of Silica Membranes For Gas Separation". Journal of Membrane Science, vol.. 143, pp. 37–51,. (1998).

M. Naito, K. Nakahira, Y. Fukuda, H. Mori, J. Tsubaki, "Process conditions on the preparation of supported microporous $SiO_2$ membranes by sol–gel modification techniques," Journal of Membrane Science, Jul. 9, 1997 pp. 263–269..

* cited by examiner

Primary Examiner—Colleen P. Cooke
(74) Attorney, Agent, or Firm—Finnegan, Henderson, Farabow, Garrett & Dunner, LLP

(57) ABSTRACT

The present invention relates to a method for preparing a composite silica membrane with thermal stability by a soaking-rolling method, and more particularly to a method for preparing a composite silica membrane with improved thermal stability by rolling the surface of a porous support with silica xerogel, soaking-rolling the surface with γ-alumina, coating, drying, and sintering the porous support surface, thereby forming a fine coating membrane on the porous support surface.

8 Claims, 2 Drawing Sheets

Soaking-Rolling Method

Dipping Method

PREPARATION OF COMPOSITE SILICA MEMBRANES WITH THERMAL STABILITY BY A SOAKING-ROLLING METHOD

BACKGROUND OF THE INVENTION

1. Field of the Invention

The present invention relates to a method for preparing a composite silica membrane with thermal stability by a soaking-rolling method, and more particularly to a method for preparing a composite silica membrane with improved thermal stability by rolling the surface of a porous support with silica xerogel, soaking-rolling the surface with γ-alumina, coating, drying, and sintering the porous support surface, and thereby forming a fine coating membrane on the porous support surface.

2. Description of Related Art

Hydrogen purification using inorganic membranes has drawn much attention of many researchers because it requires a smaller scale than other separation-purification techniques while consuming less energy. There are various methods for preparing inorganic membranes and many different kinds of supports may be used. As supports, alumina, vycor glass, and stainless steel have been used, and alumina support has been most favored.

Conventional methods for preparing inorganic membranes are sol-gel method, chemical vapor deposition, sputtering, electroplating, electroless plating, and the like. Of these, the sol-gel method has attracted much attention due to its simple equipments and process. However, sol-gel inorganic membranes prepared mostly by a dipping method are disadvantageous in that they become unstable at high temperatures. While inorganic membranes prepared by chemical vapor deposition have good thermal stability at high temperatures, sol-gel inorganic membranes have poor thermal stability [Burggraaf, "Fundamentals of Inorganic Membrane Science and Technology" p. 297, Elsevier, NL, 1997]. There was an attempt to prepare inorganic membranes with good separation ability using a material having a high microporosity and a uniform porosity distribution [R. M. de Vos, et al., *J. Membr. Sci.*, 143 (1998) 37–51; B. N. Nair et al., *J. Membr. Sci.*, 135 (1997) 237–243]. However, even if a coating material having good physical properties in terms of microscopic view is used, it cannot exert its full ability if there arises a macroscopic cracking. Similarly, if inorganic membranes prepared by the sol-gel method have cracks on the surface coating membrane due to thermal instability, the separation ability of the membranes will significantly deteriorate no matter how good physical properties the coating material has. If this problem can be solved, sol-gel inorganic membranes will be able to be used in a variety of fields, including high-temperature hydrogen purification and high-temperature membrane reactors.

SUMMARY OF THE INVENTION

The inventors of the present invention have worked to develop a method for preparing methods of silica sol-gel inorganic membranes with superior thermal stability for many years. As a result, they found that inorganic membranes prepared by rolling the surface of a porous support with silica xerogel, soaking-rolling the surface with γ-alumina, coating, drying, and soaking-rolling the surface coating material under vacuum, thereby forming a fine coating membrane on the porous support surface, has such an improved thermal stability, that it maintains its separation ability at high temperatures. Accordingly, an object of the present invention is to provide a preparation method of composite silica membranes with thermal stability by a soaking-rolling method.

DETAILED DESCRIPTION AND THE PREFERRED EMBODIMENTS

The present invention is relates to a method for preparing composite silica membranes with thermal stability by a soaking-rolling method, which comprises:

(a) a primary modification of surface of a porous support, wherein silica xerogel is penetrated into the porous support surface by pressing and then sintered;

(b) a secondary modification of said primarily modified surface of the porous support by soaking the primarily modified surface with γ-alumina sol via a soaking-rolling method, followed by drying and sintering; and (c) formation of a coating membrane by soaking said primarily and secondarily modified surface with a surface coating material in sol phase by a soaking-rolling method, followed by drying and sintering.

Hereinafter, the present invention is described in more detail.

Alumina is widely used for a porous support in manufacturing inorganic membranes. However, since alumina easily cracks in a modulated and commercialized process for preparing inorganic membranes, the most preferable support of the present invention is a porous stainless steel support. In the present invention, the porous stainless steel support is modified twice on its surface using silica xerogel and γ-alumina sol, whose particle size ranging from 80 to 120 nm, in order to obtain pores having a relatively large size and uniform size distribution.

Hereinafter, surface modification of the porous support is described in more detail.

The silica xerogel used in the primary surface modification is synthesized from silica sol having a particle size of 80 to 120 nm by the method of silica sol synthesis reported in the literature [Brinker and Scherer, "*Sol-Gel Science*" p. 273, Academic Press, 1990]. Thus synthesized silica sol is removed of the solvent using a rotary evaporator to obtain the silica xerogel. And, the γ-alumina sol used in the secondary surface modification is synthesized by the sol synthesis method reported in the literature [K. Kusakabe, et al., *J. Membr. Sci.*, 115 (1996) 65–75].

Figure 1:
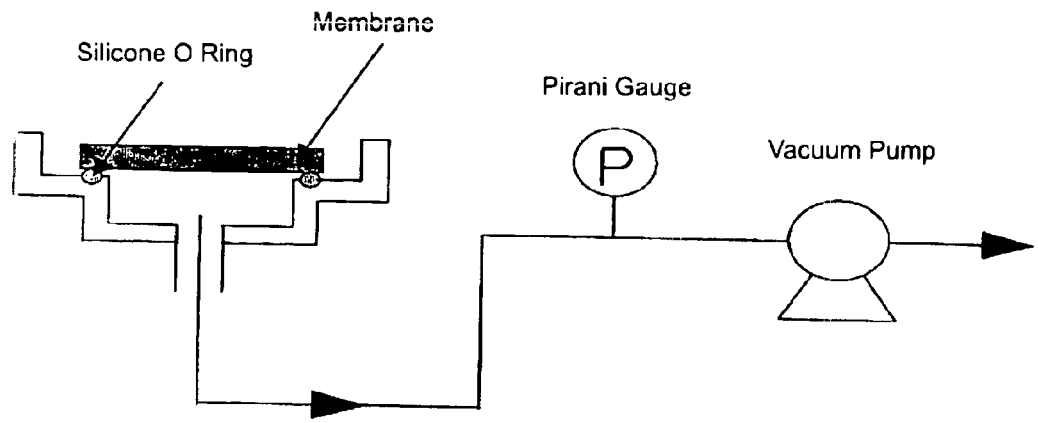
FIG. 1 shows a coating unit for composite silica membranes using soaking-rolling method.

Firstly, the silica xerogel is applied on one side of the porous support, and the silica particles are penetrated into the pores of the stainless steel support by rolling at 100 to 300 atm. Then, the support is sintered in an electric furnace at 600 to 700° C. for 1 to 3 hours. This is the primary surface modification. During the sintering, heat is supplied at the rate of 1 to 3° C./min. Then, the support surface is coated with γ-alumina sol by a soaking-rolling method. This is the secondary surface modification. FIG. 1 shows the soaking-rolling coating unit used in the present invention. To describe the secondary surface modification more specifically, the surface of the porous support modified with silica xerogel is wetted with γ-alumina sol. Then, vacuum is applied from the lower part to soak pores on the support surface with the sol solution. Then, the sol solution wetting the surface of the support is rolled with a rubber roller to coat it. The coated membrane is dried at 20–30° C. with relative humidity of 50–70% for 10–15 hours and sintered in an electric furnace at 600–700° C. for 1–3 hours. During the sintering, heating is supplied at the rate of 1–3° C./min. This soaking-rolling, drying, and sintering process may be repeated more than two times.

Passing through the first and second surface modifications, the porous support becomes mesoporous.

The modified porous support is coated with polymeric silica sol, a surface coating material, by a soaking-rolling method to prepare the composite silica membrane of the present invention. The surface coating material, i.e. polymeric silica sol, is synthesized by the sol synthesis method reported in the literature [M. Naito, et al., *J. Membr. Sci.,* 129 (1997) 263–269]. The synthesized polymeric silica sol is coated on the modified support by a soaking-rolling method. That is, the procedure of the secondary surface modification is repeated with the coating unit shown in FIG. 1. The coated composite silica membrane is dried under the condition of 20 to 30° C. and R.H. 50 to 70% for 10 to 15 hours, and sintered in a 450 to 500° C. of electric furnace for 1 to 3 hours. During the sintering, the heating rate is 1 to 3° C./min. This soaking-rolling, drying, and sintering for polymeric silica sol surface coating can be repeated more than two times.

The composite silica membrane of the present invention, which is synthesized by a soaking-rolling method, has superior thermal stability compared to the conventional membrane coated by dipping.

This invention is explained in more detail based on the following Examples but they should not be construed as limiting the scope of this invention.

EXAMPLE

Figure 2:
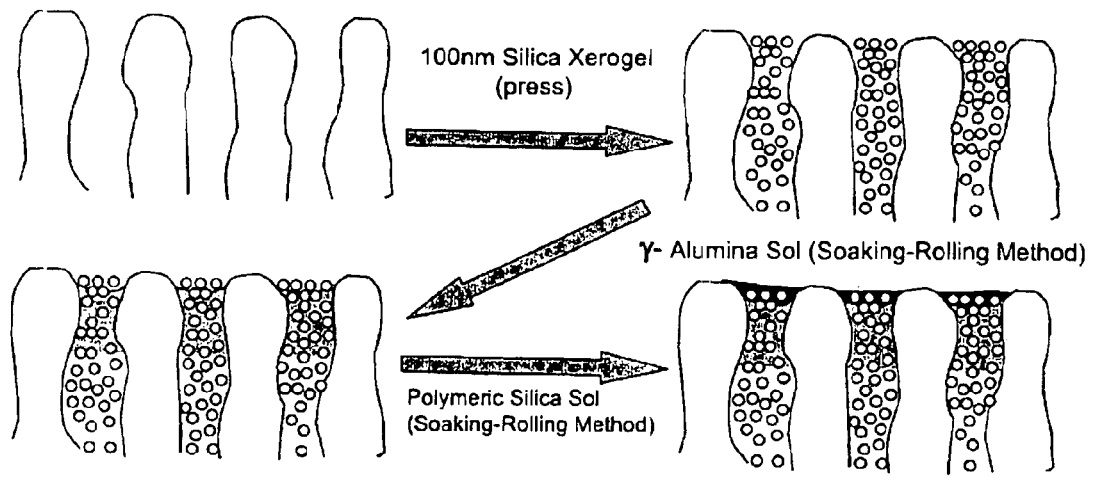
FIG. 2 is a schematic diagram of surface modification and surface coating processes of a porous stainless steel support.

Surface modification of a porous support and polymeric silica coating were carried out as in FIG. 2. That is, silica xerogel having a particle size of 80 to 120 nm was applied on a porous stainless steel disc (Mott Metallurgical Co.) support, which is 1 mm thick and has an area of 5 cm². Then, the support was rolled at 200 atm with a press, and sintered in an electric furnace at 600° C. for 2 hours.

The surface of the stainless steel support with primary modification was placed under secondary modification with γ-alumina sol by a soaking-rolling method, and dried at 25° C. with relative humidity of 60% for 12 hours, and then sintered at 600° C. for 2 hours. This soaking-rolling, drying, and sintering process was repeated for three times. In the above process, the soaking time was fixed to 3 minutes. The second-modified support was coated with polymeric silica sol, a surface coating material, by soaking-rolling, drying, and sintering for four times. In the above process, the soaking time was fixed to 3 minutes.

COMPARATIVE EXAMPLE

To compare the composite silica membrane synthesized by a soaking-rolling method according to the present invention with the conventional composite silica membrane synthesized by dipping, a composite silica membrane was prepared by dipping as follows.

As in Example, surface of a porous stainless steel disc support was rolled with silica gel for surface modification. Then, the surface-modified support was dipped into a γ-alumina sol solution for 1 minute. The support was dried and sintered. Then, the support was dipped into a polymeric silica sol solution for 1 minute to obtain a silica composite membrane.

Figure 3:
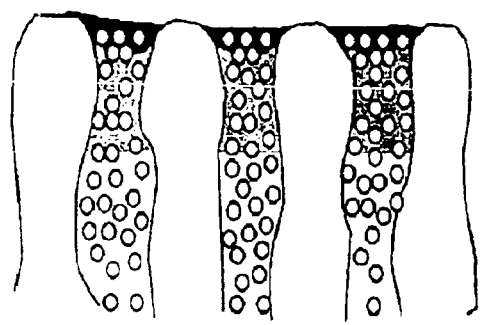
FIG. 3 compares cross-sections of composite silica membranes prepared by a soaking-rolling method and a dipping method.
Figure 3:
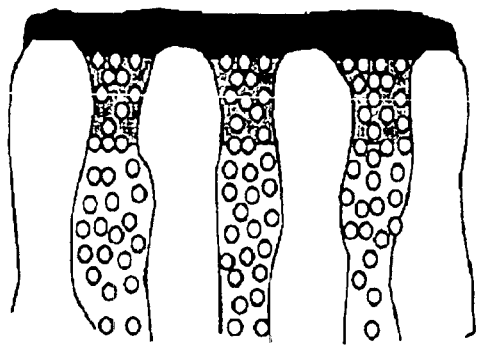

Cross-sections of the composite silica membrane synthesized by a soaking-rolling method (Example) and the composite silica membrane synthesized by dipping (Comparative Example) are compared in FIG. 3. As seen in FIG. 3, the composite silica membrane prepared by a soaking-rolling method has many fine surface coating membranes having an area about the size of the support pores, since the polymeric silica is selectively soaked at the porous part of the support.

EXPERIMENTAL EXAMPLE

Gas penetration test was carried out with the composite silica membranes prepared in Example and Comparative Example.

Gas penetration test was carried out using a mixture gas of $H_2/N_2$ (99/1%) at 28° C., 150° C., 250° C., and 350° C. Argon was used as a sweeping gas of the penetration side, and pressures of both the supply side and the penetration side were set at atmospheric pressure. The penetrating gas was analyzed by gas chromatography (Model GC-14B, Shimatsu), and a thermal conductivity detector (TCD) was used for detection. The column used was Molecular Sieve 5A while argon (Ar) was used as the carrier gas. Temperatures of the column and the detector were 100° C. and 120° C., respectively, and the detector current was 60 mA. Permeance of nitrogen and hydrogen was calculated by the following Equation 1, $$F_i = \frac{Q_i}{A \Delta P_i} \quad \text{Equation 1}$$

wherein $F_i$ is the penetration amount of the component I (mol/s); A is the effective penetration area of the membrane; and $\Delta P_i$ is the difference in partial pressures of the component i in the supply side and the penetration side.

TABLE 1

| | | Penetration temperature | | | |
|---|---|---|---|---|---|
| | Classification | 28° C. | 150° C. | 250° C. | 350° C. |
| Example | Hydrogen permeance (mol/m² · s · Pa) | $8.28 \times 10^{-9}$ | $8.88 \times 10^{-9}$ | $8.48 \times 10^{-9}$ | $4.61 \times 10^{-6}$ |
| | Nitrogen concentration at penetration side (ppm) | 510 | 500 | 515 | 4200 |

TABLE 1-continued

| | | Penetration temperature | | | |
|---|---|---|---|---|---|
| | Classification | 28° C. | 150° C. | 250° C. | 350° C. |
| Comp. Example | Hydrogen permeance (mol/m² · s · Pa) | $1.69 \times 10^{-8}$ | $2.29 \times 10^{-8}$ | $3.02 \times 10^{-8}$ | $3.74 \times 10^{-8}$ |
| | Nitrogen concentration at penetration side (ppm) | Not detected | Not detected | Not detected | Not detected |

In Table 1, Comparative Example shows the result for a composite silica membrane prepared by dipping. In Comparative Example, the nitrogen concentration at the support side (10,000 ppm) decreased to about 500 ppm at the penetration side, up to the temperature of 250° C. However, at 350° C., the nitrogen concentration at the penetration side was about 4,200 ppm. That is, the penetration efficiency decreased abruptly, and penetration of hydrogen also increased significantly compared to that below 250° C. The fact that nitrogen concentration at the penetration side increased significantly indicates that permeance of nitrogen increased along with that of hydrogen. In other words, it shows that the membrane was severely damaged under hot hydrogen atmosphere. The permeance at 350° C. was almost identical to that of the support. As seen from the result of Comparative Example, the sol-gel composite silica membrane prepared by dipping was very unstable above 250° C.

On the other hand, the composite silica membrane of Example passed hydrogen only up to the temperature of 350° C., and nitrogen was not detected by gas chromatography. The permeance was maintained even after one week.

Therefore, the sol-gel composite silica membrane prepared by a soaking-rolling method according to the present invention remained stable even at 350° C. of high temperature, and had superior hydrogen permeance and separation ability compared to the silica membrane prepared by dipping method because the surface coating material penetrated into the support pores.

The present invention provides a composite silica membrane prepared by rolling a porous support with silica xerogel (first surface modification), surface-modifying the same with γ-alumina sol by a soaking-rolling method (second surface modification), and surface-coating the same with polymeric silica, a surface coating material, by a soaking-rolling method. The composite silica membrane of the present invention has superior thermal stability than the conventional composite membrane prepared by dipping, thus it can be used in a wider temperature range. Further, it can be used for membrane reactors and for high-temperature hydrogen purification.

What is claimed is:

1. A method for preparing a composite silica membrane comprising the following steps of:

(a) a primary modification of surface of a porous support, wherein silica xerogel is penetrated into said porous support surface by pressing and then sintered;

(b) a secondary modification of said primarily modified surface of said porous support by soaking said primarily modified surface with γ-alumina sol via a soaking-rolling method, followed by drying and sintering; and (c) formation of a coating membrane by soaking said primarily and secondarily modified surface with a surface coating material in sol phase by a soaking-rolling method, followed by drying and sintering.

2. The method for preparing a composite silica membrane according to claim 1, wherein said primary modification is performed by rolling wherein said silica xerogel having a particle size of 80 to 120 nm is penetrated into said surface of said support at 100 to 200 atm, and then sintered at 600 to 700° C. for 1–3 hours.

3. The method for preparing a composite silica membrane according to claim 1, wherein said secondary modification is performed by wetting upper part of said support with γ-alumina sol while applying vacuum at the lower part of said support thereby facilitating penetration of said γ-alumina sol into the pores of said support while the sol solution still remaining after said penetration is being rolled.

4. The method for preparing a composite silica membrane according to claim 1, wherein said support is a porous stainless steel support.

5. The method for preparing a composite silica membrane according to claim 1, wherein said surface coating material is polymeric silica sol.

6. The method for preparing a composite silica membrane according to claim 1, wherein the size of pores of said support after said primary modification and said secondary modification is in the range of from 5 to 10 nm.

7. The method for preparing a composite silica membrane according to claim 1, wherein formation of said coating membrane is performed by wetting upper part of said support with a surface coating material in sol phase while applying vacuum at the lower part of said support, thereby facilitating penetration of said coating material into the pores of said support while the sol solution still remaining after said penetration is being rolled.

8. The method for preparing a composite silica membrane according to claim 1, wherein said drying is performed at 20 to 30° C. with relative humidity of 50 to 70% for 10 to 15 hours, and the sintering is performed at 500° C. to 600° C.

* * * * *